No. 812,436. PATENTED FEB. 13, 1906.
D. P. MORRISON.
SYSTEM OF CALIBRATING RECORDING WATT HOUR METERS.
APPLICATION FILED JUNE 17, 1905.

Witnesses
Ivan Konigsberg
Anna Wiesemann

Douglas P. Morrison, Inventor
By his Attorneys
Beeken & Spaulding

UNITED STATES PATENT OFFICE.

DOUGLAS P. MORRISON, OF NEWARK, NEW JERSEY.

SYSTEM OF CALIBRATING RECORDING WATT-HOUR METERS.

No. 812,436.　　　Specification of Letters Patent.　　　Patented Feb. 13, 1906.

Application filed June 17, 1905. Serial No. 265,666.

*To all whom it may concern:*

Be it known that I, DOUGLAS P. MORRISON, a citizen of the United States of America, and a resident of Newark, county of Essex, and State of New Jersey, have invented certain new and useful Improvements in Systems of Calibrating Recording Watt-Hour Meters, of which the following is a specification.

The present invention relates to a system of calibrating a recording watt-hour meter.

In the prior art it has been customary to test a meter by means of electrical measuring instruments or else by means of a standard meter introduced in circuit with the unknown meter, so as to subject the said standard meter to the same load as the unknown meter. When the latter method is followed, it is necessary to have two persons, one to observe the measurements of each meter during a certain predetermined period while subjected to the same load and to then compare the thus-observed results, thereby ascertaining the variance between the standard and the unknown meters, if any there be.

The object of the present invention is to simplify this method without complicating the parts, so that the test can be made by one person.

To this end the invention consists in subjecting a standard meter to the same load as the unknown meter, but in such a manner that the current passes through the standard meter without operating the recording mechanism of the same, then starting and stopping the recording mechanism of the standard meter at will, and then comparing the observed units of the unknown meter with the recorded units of the standard meter. The means for carrying this object into effect may vary considerably; but a simple and effective arrangement consists in placing the field-coils of the standard and unknown meters in circuit with each other and in circuit with the mains leading from the source to the load in connecting the potential-circuits of the two meters with the mains and by interposing a switch in the potential-circuit of the standard meter.

In the accompanying drawings the invention has been embodied in a form which will be readily understood by any one versed in the art. The specific embodiment, however, may be varied widely to suit the local needs or different constructions of meters without departing from the invention.

Figure 1:
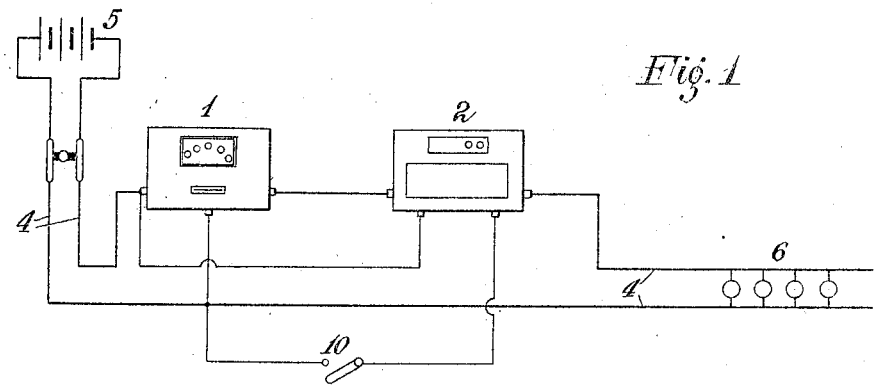
Figure 2:
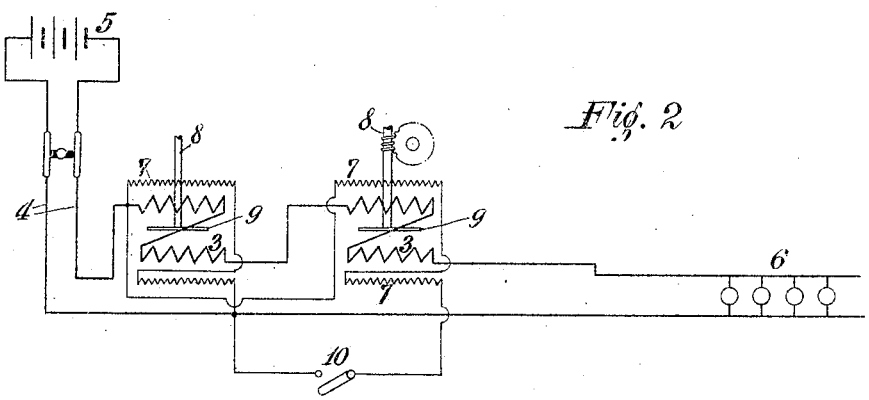
Figure 3:
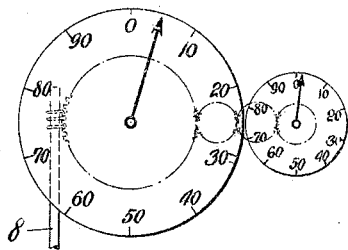
Figure 4:
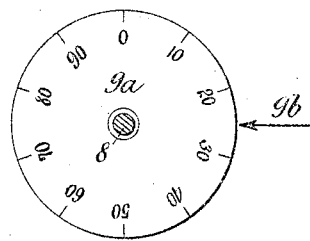

In the said drawings, Figure 1 is a view showing a conventional representation of two meters with the electrical circuit indicated. Fig. 2 is a diagrammatic view showing the windings of the meters, as well as the electrical circuits connecting the same. Fig. 3 is a detail view of the dials of the standard meter. Fig. 4 is a plan view of the disk of the standard meter, showing a modification.

Similar numerals of reference indicate corresponding parts in the different views.

1 indicates the unknown meter, and 2 the standard meter. These may be of any usual or suitable construction and need not be described in detail. Suffice it to say that each of the said meters is provided with the usual windings, consisting of the field-coils 3 in circuit with the mains 4, leading from the source 5 to the load 6 and having, further, the potential-circuit 7, connected to the brush-holders (not shown) in the usual manner. The recording mechanism is operated in the usual way by means of the shaft 8, carrying the disk 9, driven in the usual way by means of the torque exercised by the two circuits.

When it is desired to calibrate an unknown meter, the standard meter is subjected to the same load as the unknown meter by connecting the field-coils of the standard meter with the mains of the work-circuit, as indicated in the drawings, but in such a manner that the recording mechanism of the standard meter is not operated. This is conveniently done by introducing any suitable switch, as 10, in the potential-circuit leading from the brush-holders of the standard meter to the mains. It will be understood, therefore, that the standard meter being placed in circuit with the unknown meter the current will pass through both, subjecting both to the same load and operating the recording mechanism of the unknown meter, while the recording mechanism of the standard meter does not operate, as the switch 10 is left open. The position of the hand on the dial or dials of the standard meter is noted, and at a certain point of the revolution of the unknown meter the switch 10 is closed, thereby making the recording mechanism of the standard meter operative. A revolution or a certain number of revolutions of the unknown meter is then observed, and the switch 10 is then thrown out again, thereby causing the recording mechanism of the standard meter to cease operation. The observed result of the unknown meter is then compared with the recorded results of the standard meter, and the variance, if any, can be determined thereby. In this way it will be understood that only one person is needed to effect the test, and consequently a more perfect calibration is made possible, as the starting and stopping of the test is absolutely under the control of one person.

The standard meter is of any usual construction; but it is preferable to arrange the same with only two dials and recording-hands and to gear the first hand so that it makes one revolution to every ten revolutions of the disk 9 and to have the dial read from zero to one hundred. The hand of the second dial may be geared so as to indicate fractions of units or fractions of revolutions, as the case may be, by causing it to make ten revolutions to each revolution of the hand of the first dial. In Fig. 4 is shown a modification of this, in which the disk 9$^a$ of the standard meter is graduated, and the fixed hand 9$^b$ is placed adjacent thereto, so that fractional parts of units or of revolutions may be read by the relative position of the disk 9$^a$ with reference to the hand 9$^b$. In that instance the second dial and hand (shown in Fig. 3) may be dispensed with. Of course any other arrangement of recording mechanism found useful may be used in connection therewith.

What is claimed is—

1. The method of calibrating an unknown recording watt-hour meter, which consists in subjecting a standard meter to the same load as the unknown meter in such a manner that the current passes through the standard meter without operating the recording mechanism of the same, then starting and stopping the recording mechanism of the standard meter at will, and then comparing the observed units of the unknown meter with the recorded units of the standard meter.

2. The method of calibrating an unknown recording watt-hour meter, which consists in subjecting a standard meter to the same load as the unknown meter in such a manner that the current passes through the standard meter without operating the recording mechanism of the same, then starting and stopping the recording mechanism of the standard meter at will, and then comparing the observed units and fractions of units of the unknown meter with the recorded units and fractions of units of the standard meter.

3. The method of calibrating an unknown recording watt-hour meter which consists in subjecting a standard meter to the same load as the unknown meter in such a manner that the current passes through the standard meter without operating the recording mechanism of the same, then starting and stopping the recording mechanism of the standard meter at will, and then comparing the observed revolutions of the unknown meter with the recorded revolutions of the standard meter.

4. The method of calibrating an unknown recording watt-hour meter which consists in subjecting a standard meter to the same load as the unknown meter in such a manner that the current passes through the standard meter without operating the recording mechanism of the same, then starting and stopping the recording mechanism of the standard meter at will and then comparing the observed revolutions and fractions of revolutions of the unknown meter with the recorded revolutions and fractions of revolutions of the standard meter.

5. In a system of the character described, the combination with an unknown and a standard meter, whose field-coils are in circuit with each other and in circuit with the mains leading from the source to the load, of a potential-circuit for each meter leading to the mains, and a switch interposed in the potential-circuit of the standard meter.

Signed at Newark, New Jersey, this 15th day of June, 1905.

DOUGLAS P. MORRISON.

Witnesses:
EDITH McD. BEEKEN,
AXEL V. BEEKEN.